(12) United States Patent
Gokhale et al.

(10) Patent No.: US 6,965,290 B2
(45) Date of Patent: Nov. 15, 2005

(54) LOW HARMONIC RECTIFIER CIRCUIT

(75) Inventors: Kalyan P. Gokhale, New Berlin, WI (US); Alpo K. Vallinmäki, Mukwonago, WI (US); Nicklas Jan Anders Sodo, Espoo (FI)

(73) Assignees: ABB Inc., Norwalk, CT (US); ABB Oy, Helsinki (FI)

( * ) Notice: Subject to any disclaimer, the term of this patent is extended or adjusted under 35 U.S.C. 154(b) by 143 days.

(21) Appl. No.: 10/635,271

(22) Filed: Aug. 6, 2003

(65) Prior Publication Data

US 2004/0046634 A1 Mar. 11, 2004

Related U.S. Application Data

(62) Division of application No. 10/241,200, filed on Sep. 11, 2002, now Pat. No. 6,774,758.

(51) Int. Cl.⁷ .............................................. H01F 17/06
(52) U.S. Cl. ..................... 336/178; 336/83; 336/212; 336/234
(58) Field of Search ......................... 336/83, 178, 212, 336/233, 234

(56) References Cited

U.S. PATENT DOCUMENTS

| | | | | |
|---|---|---|---|---|
| 2,025,093 | A | * 12/1935 | Cotter et al. | ............... 363/47 |
| 2,550,501 | A | * 4/1951 | Sims | ..................... 336/100 |
| 3,546,571 | A | * 12/1970 | Fletcher et al. | ......... 323/309 |
| 4,222,096 | A | 9/1980 | Capewell | |
| 4,282,567 | A | * 8/1981 | Voigt | ...................... 363/15 |
| 4,369,490 | A | 1/1983 | Blum | |
| 4,914,559 | A | 4/1990 | Deisch | |
| 5,559,396 | A | 9/1996 | Bruning et al. | |
| 6,144,279 | A | 11/2000 | Collins et al. | |
| 6,583,701 | B2 | * 6/2003 | Sun et al. | ................ 336/178 |
| 2003/0043006 | A1 | * 3/2003 | Sun et al. | ................ 336/178 |
| 2003/0227363 | A1 | * 12/2003 | Leisten et al. | ........... 336/178 |

FOREIGN PATENT DOCUMENTS

| | | |
|---|---|---|
| EP | 0 108 921 A1 | 10/1983 |
| EP | 0 107 266 B1 | 12/1986 |
| EP | 0 477 936 A2 | 9/1991 |
| EP | 0 577 334 A2 | 6/1993 |
| GB | 2 138 215 A | 4/1984 |
| JP | 60196918 | 5/1985 |
| JP | 61216409 | 9/1986 |
| JP | 08316039 | 11/1996 |
| WO | WO 02/19350 A1 | 8/2001 |
| WO | PCT/US03/26583 | 8/2003 |

* cited by examiner

*Primary Examiner*—Tuyen T Nguyen
(74) *Attorney, Agent, or Firm*—Michael M. Rickin, Esq.; Paul R. Katterle, Esq.

(57) ABSTRACT

Non-linear inductor(s) are used to reduce the percent total harmonic distortion of the harmonics in the line currents in the input side rectifier system of an ac drive system. Several constructions for the non-linear inductor(s) are described. The non-linear inductor(s) may be constructed from E and I laminations. The gap depends on the construction of the middle leg of the E laminations and may have a step with a constant spacing or a variable spacing which depends on the stacking of the laminations. Alternatively the non-linear inductor(s) may be constructed from a toriodal core that either has a step gap or a variable type gap.

23 Claims, 9 Drawing Sheets

LOW HARMONIC RECTIFIER CIRCUIT

This application is a divisional of application Ser. No. 10/241,200 filed Sep. 11, 2002 now U.S. Pat. No. 6,774,758.

FIELD OF THE INVENTION

This invention relates to the input side rectifier in an ac drive system and more particularly to the inductors used therein.

DESCRIPTION OF THE PRIOR ART

The two main subsystems of a modern ac drive system are the input side rectifier system and output inverter system. The purpose of the rectifier system is to convert input ac voltage, from the utility source, into an intermediate dc voltage and the purpose of the inverter system is to convert the intermediate dc voltage into a variable frequency and a variable magnitude ac output voltage. The rectifier systems are also used in equipment such as welding, electroplating and uninterruptible power supplies.

The input rectifier system consists of a three-phase diode bridge, either ac or dc side inductor(s) and dc bus capacitors. The three-phase diode bridge converts input ac voltage into dc voltage. The inductor(s) and capacitor(s) serve as a smoothing filter for the intermediate dc voltage. Such a rectifier system, when connected to a sinusoidal voltage utility source, draws non-sinusoidal currents. These harmonic currents are not desirable because of their adverse effects (such as energy losses and malfunction of the sensitive equipment) on the utility network. Therefore, it is of commercial importance to reduce the harmonic currents produced by the rectifier systems.

The magnitudes of the harmonic currents are mainly dependent on the value of the ac or dc side inductors and on the average value of the load current on the dc side. Generally speaking, the level of the harmonic line currents commonly measured in percent total harmonic distortion (% THD) is lower if the value of the inductor is large. But the larger the value of the inductor, the bigger it is in size and the more expensive it is. Also the % THD increases as the load on the rectifier circuit is reduced from full load to partial load. Since ac drives operate at partial load for most of their operating time, it is important to minimize the % THD of a rectifier circuit at partial load.

The present invention reduces the % THD of the line current of a rectifier circuit by incorporating one or more non-linear inductor(s) in the ac or dc side of the rectifier circuits. Specifically, the invention reduces the % THD of the line current at partial loads when compared with rectifier circuits using conventional (linear) inductors. As an additional benefit, the invention also reduces current ripple stress on the filter capacitor at partial loads.

SUMMARY OF THE INVENTION

A non-linear inductor having a first stack of laminations each having the same predetermined shape and at least one leg and at least one step at the end of the at least one leg. The non-linear inductor also has a second stack of laminations each having the same predetermined shape adjacent the first stack of laminations to form a flow path for magnetic flux, the at least one step at the at least one leg end and the second stack of laminations creating an air gap that has two widths between the at least one leg and the second stack of laminations to produce a desired non-linear inductance characteristic for the non-linear inductor.

A non-linear inductor having a first stack of laminations each having the same predetermined shape and at least one leg, a first predetermined number of the laminations in the first stack having a first predetermined length for the one leg and a second predetermined number of the laminations in the first stack having a second predetermined length for the one leg. The non-linear inductor also has a second stack of laminations each having the same predetermined shape adjacent the first stack of laminations to form a flow path for magnetic flux, the one leg and second stack of laminations creating an air gap that has at least two widths between the at least one leg and the second stack of laminations to produce a desired non-linear inductance characteristic for the non-linear inductor.

A non-linear inductor that has a magnetic material tape wound toroidal core; and an air gap in the core having at least two widths.

DESCRIPTION OF THE PREFERRED EMBODIMENT(S)

Figure 1:
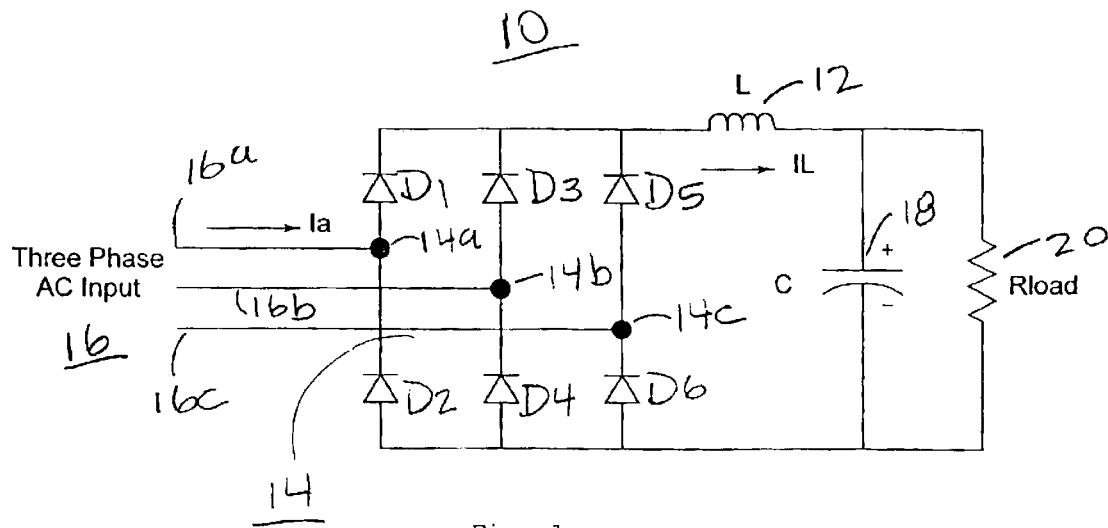
FIG. 1 shows a schematic for a three phase rectifier system that has a dc side filter inductor.

Referring now to FIG. 1, there is shown a three phase rectifier system 10 that has a dc side filter inductor 12 labeled as L. As is shown in FIG. 1, the system has bridge 14 connected directly to the three phases 16a, 16b and 16c of the ac input 16. Bridge 14 has six diodes D1 to D6. Input phase 16a is connected to diodes D1 and D2 at junction 14a, input phase 16b is connected to diodes D3 and D4 at junction 14b, and input phase 16c is connected to diodes D5 and D6 at junction 14c. Filter inductor 12 is connected between the cathode of each of diodes D1, D3 and D5 and one terminal of a capacitor 18, labeled as C, which is in parallel with load 20 represented in FIG. 1 by a resistor labeled Rload. The other terminal of capacitor 18 is connected to the anode of each of diodes D2, D4 and D6.

Figure 2:
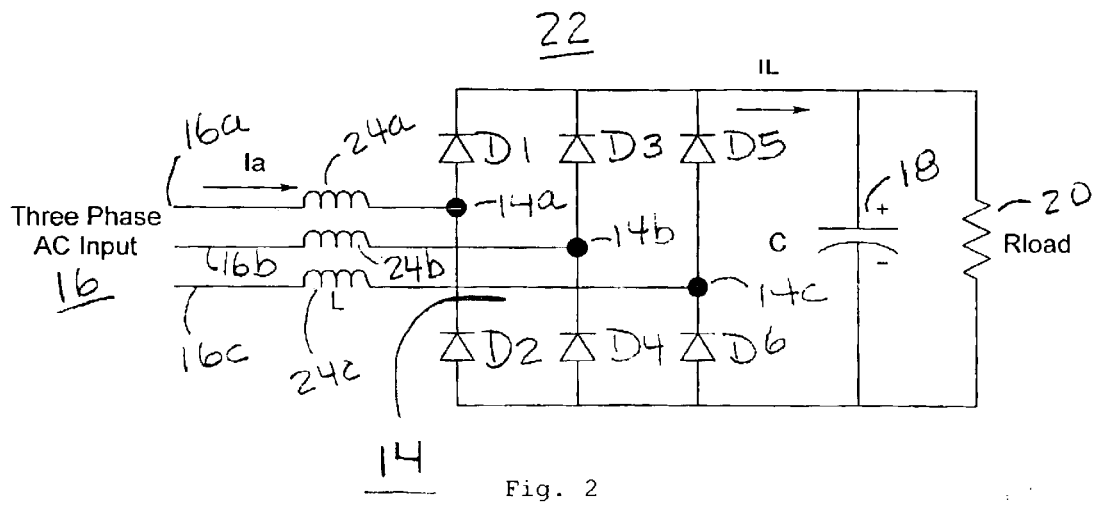
FIG. 2 shows a schematic for a three phase rectifier system that has an ac side filter inductor.

FIG. 2 shows a three phase rectifier system 22 in which bridge 14 is connected to the three phases of ac input 16 through three filter inductors 24a, 24b and 24c. Except for the difference in the location of the filter inductors, systems 10 and 22 are otherwise identical and therefore elements in FIG. 2 which have the same function as a corresponding element in FIG. 1 have the same reference numeral that is used in FIG. 1 for that element.

While the present invention is described below in connection with the rectifier system of FIG. 1, the description is equally applicable to the rectifier system of FIG. 2.

Figure 3:
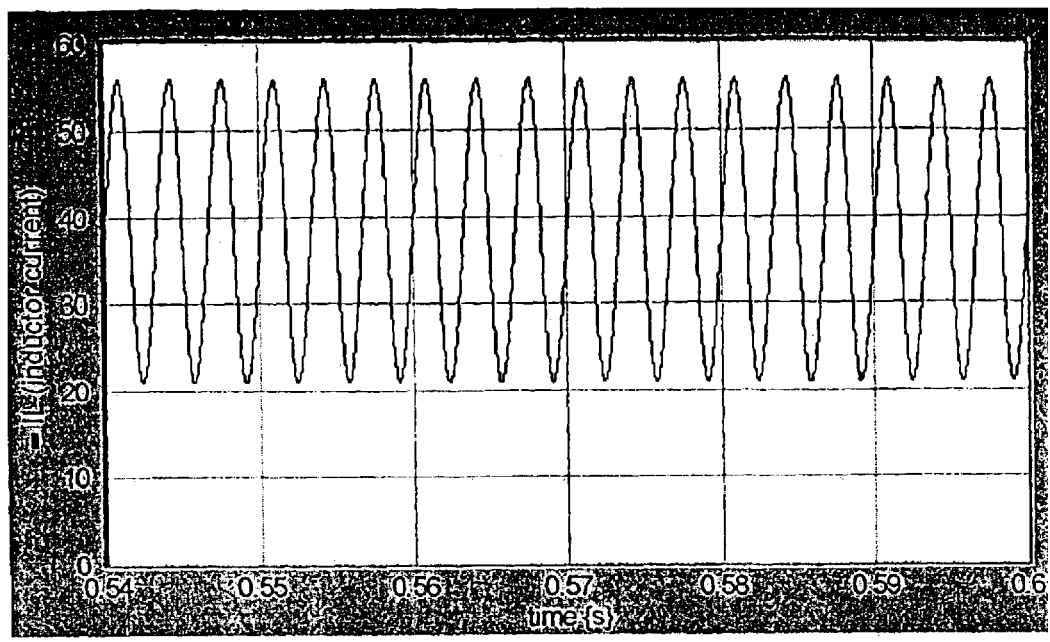
FIG. 3 shows the current through the inductor of the rectifier system of FIG. 1
Figure 4:
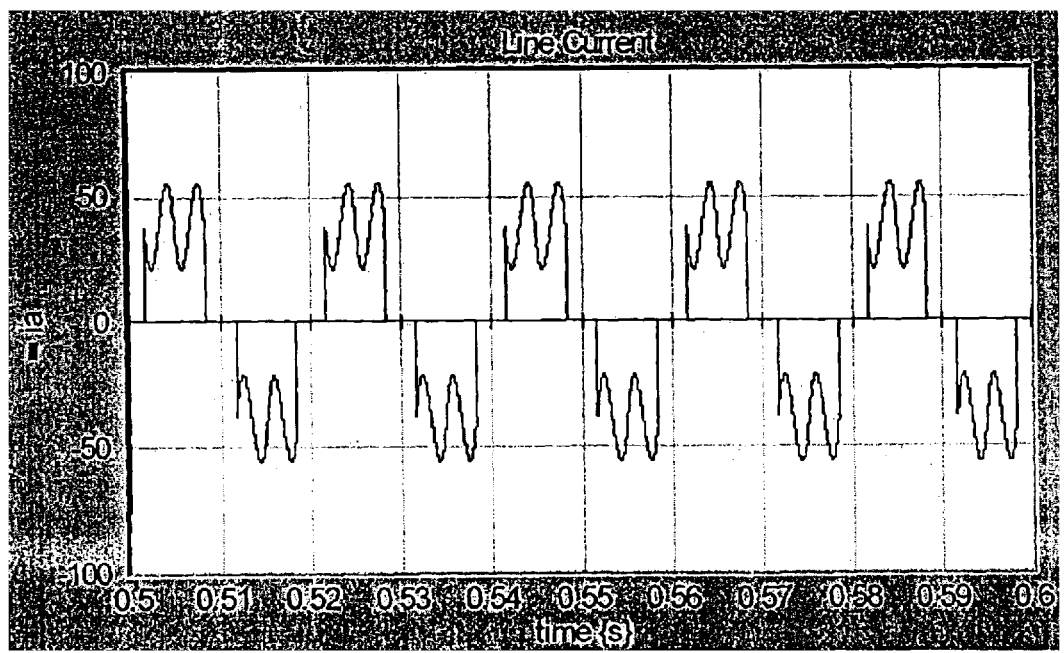
FIG. 4 shows the line current through phase A of that system with a linear inductor.

Referring now to FIGS. 3 and 4 there is shown in FIG. 3 the current, IL, through inductor 12 and in FIG. 4 the line current Ia of input phase 16a for a rectifier circuit that has a linear inductor. The inductance of a linear inductor is substantially constant as a function of the current flowing through it. As an example, the circuit component values are as follows:

Vin=400V rms at 50 Hz, line-to-line utility voltage
L=1100 µH
C=1150 µF
Rload=14 Ω.

Table 1 below shows the harmonic content of the line current Ia in absolute values and as a percentage of the total rms current. The circuit is operating-at the rated power level.

TABLE 1

| Harmonic Order | Harmonic Current (A) | % of RMS Current |
|---|---|---|
| Fundamental | 42.66 | 91.75 |
| $5^{th}$ | 13.86 | 29.80 |
| $7^{th}$ | 10.49 | 22.56 |
| $11^{th}$ | 3.84 | 8.27 |
| $13^{th}$ | 3.68 | 7.92 |
| $17^{th}$ | 2.49 | 5.36 |
| $19^{th}$ | 2.34 | 5.03 |
| RMS Current (A) | | 46.50 A |
| % THD | | 39.78% |

Figure 5:
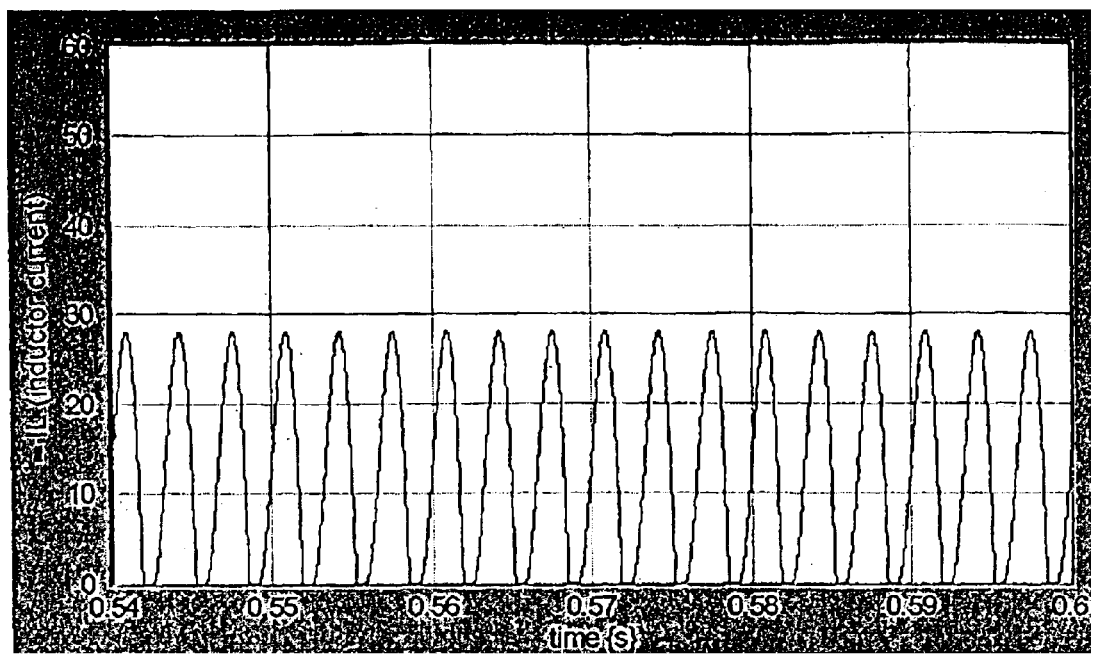
FIG. 5 shows the current through the inductor of the rectifier system of FIG. 1
Figure 6:
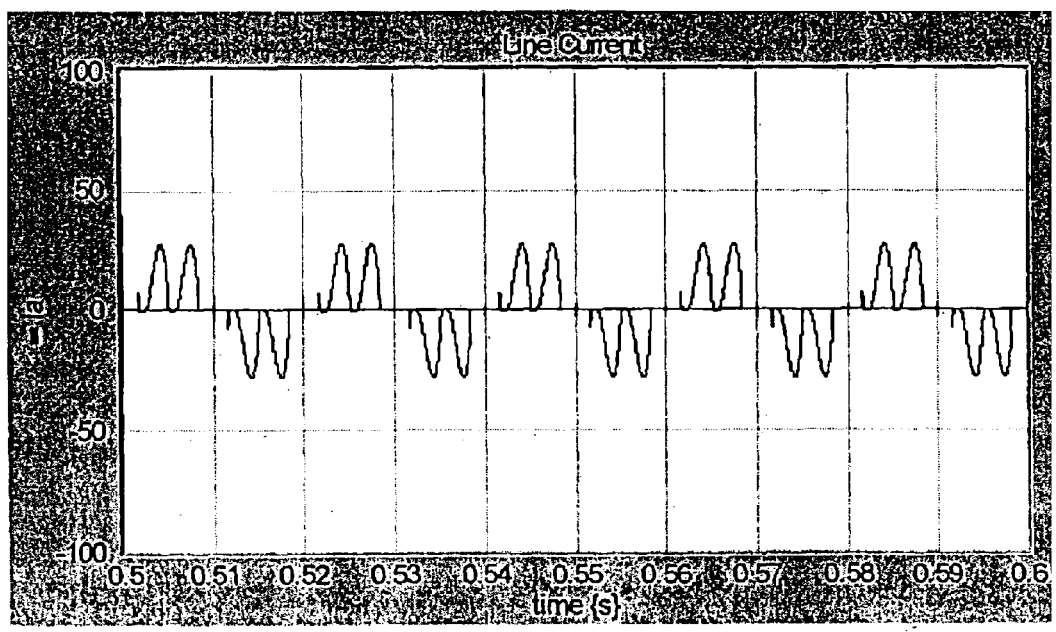
FIG. 6 shows the line current through phase A of that system with a linear inductor and the load on the system at only a predetermined percentage of the rated load.

Referring now to FIGS. 5 and 6 there is shown in FIG. 5 the current IL through the inductor 12 and in FIG. 6 the line current Ia of phase 16a for a rectifier circuit with a linear inductor but the load on the rectifier circuit is at 33% of the rated load, that is, Rload=42 Ω. Table 2 below shows the harmonic content of the line current Ia in absolute values and as a percentage of the total rms current. The rectifier circuit is operating at a 33% power level.

TABLE 2

| Harmonic Order | Harmonic Current (A) | % of RMS Current |
|---|---|---|
| Fundamental | 14.69 | 76.12 |
| $5^{th}$ | 10.01 | 51.84 |
| $7^{th}$ | 7.10 | 36.81 |
| $11^{th}$ | 1.73 | 8.97 |
| $13^{th}$ | 1.35 | 6.98 |
| $17^{th}$ | 0.86 | 4.45 |

TABLE 2-continued

| Harmonic Order | Harmonic Current (A) | % of RMS Current |
|---|---|---|
| $19^{th}$ | 0.74 | 3.85 |
| RMS Current (A) | | 19.30 A |
| % THD | | 64.85% |

A comparison of the harmonic data from Table 1 and Table 2 shows that when a linear inductor is used for inductor 12, there is a substantial increase in the percentage of harmonic currents at partial load when compared with the data at rated load.

Figure 7:
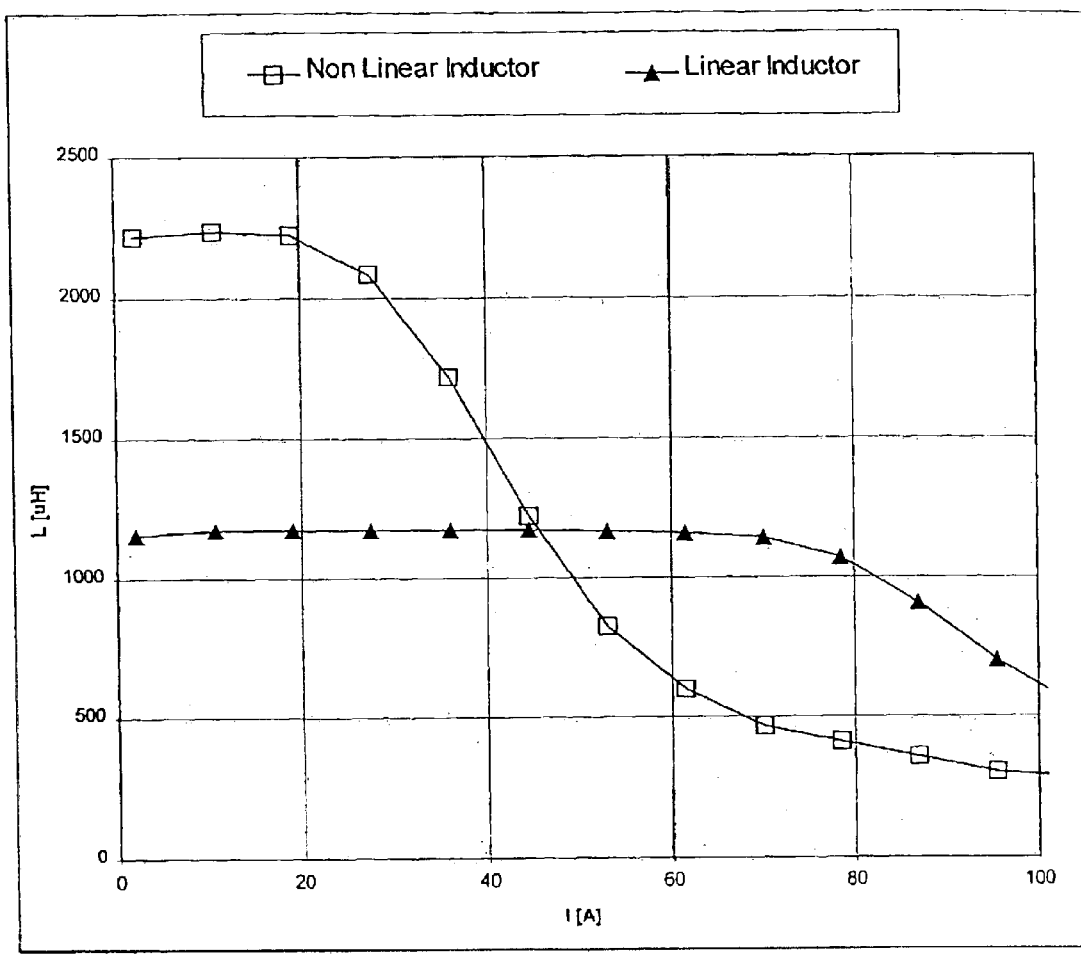
FIG. 7 shows inductance versus operating current curves for the linear and non-linear inductors.

Replacing the linear inductor by a nonlinear inductor can substantially reduce the harmonic current content of the line current of the rectifier circuit. The nonlinear (also called swinging choke) inductor has a higher value of inductance at lower currents but a lower value of inductance at higher current levels. FIG. 7 shows inductance versus operating current curves for the linear inductor and for the nonlinear inductor where the amount of core material (laminations) and the number of turns of the winding are identical in both inductors. The construction method for the nonlinear inductor is described below.

Figure 8:
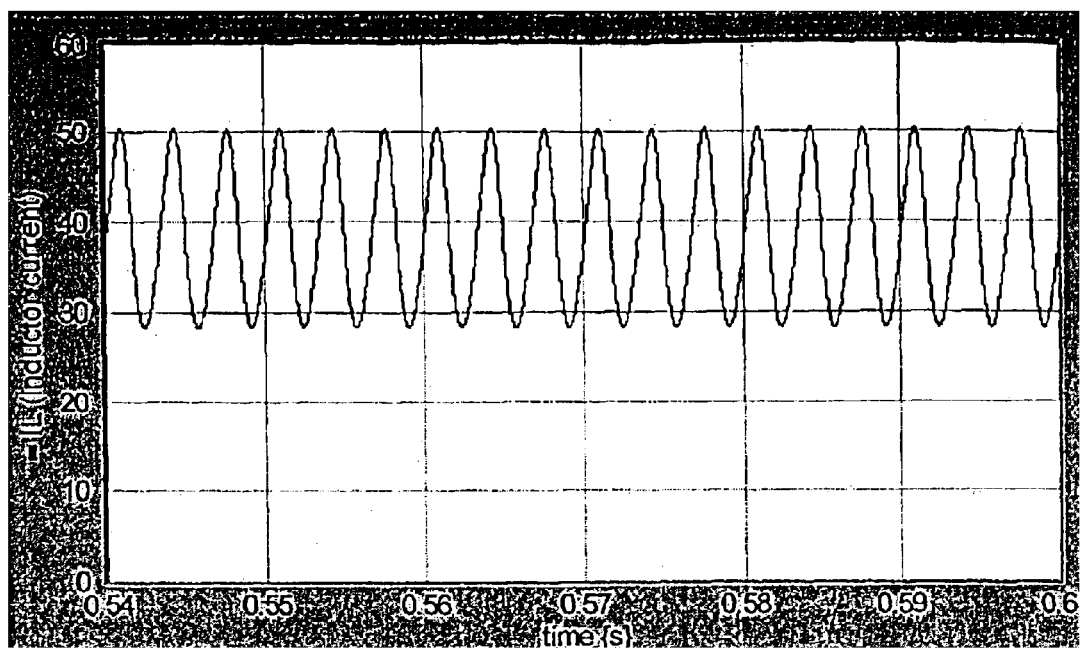
FIG. 8 shows the current through the inductor of the rectifier system of FIG. 1
Figure 9:
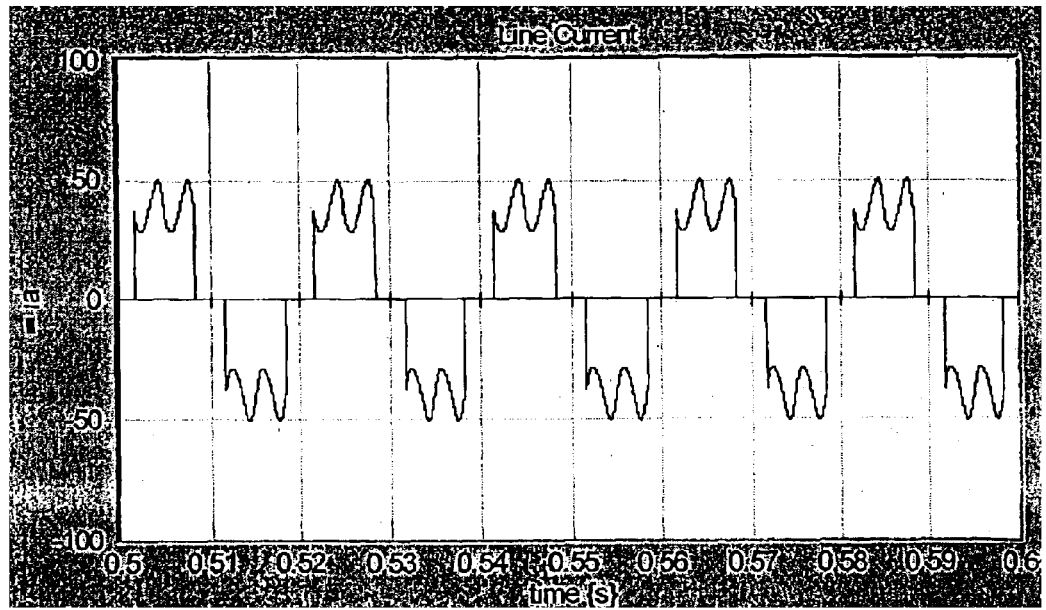
FIG. 9 shows the line current through phase A of that system with a non-linear inductor.
Figure 10:
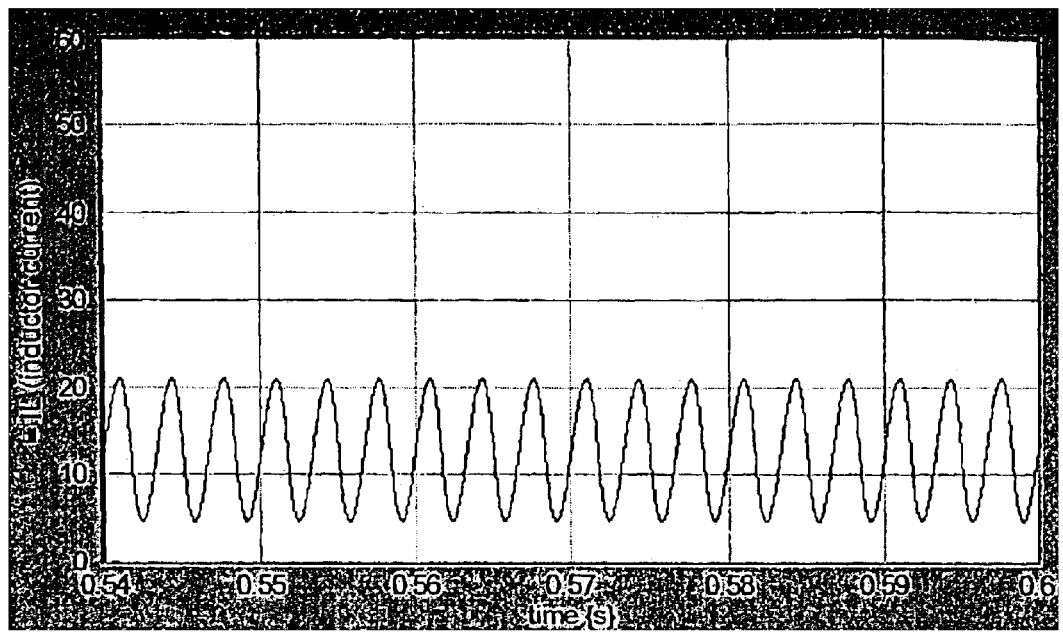
FIG. 10 shows the current through the inductor of the rectifier system of FIG. 1
Figure 11:
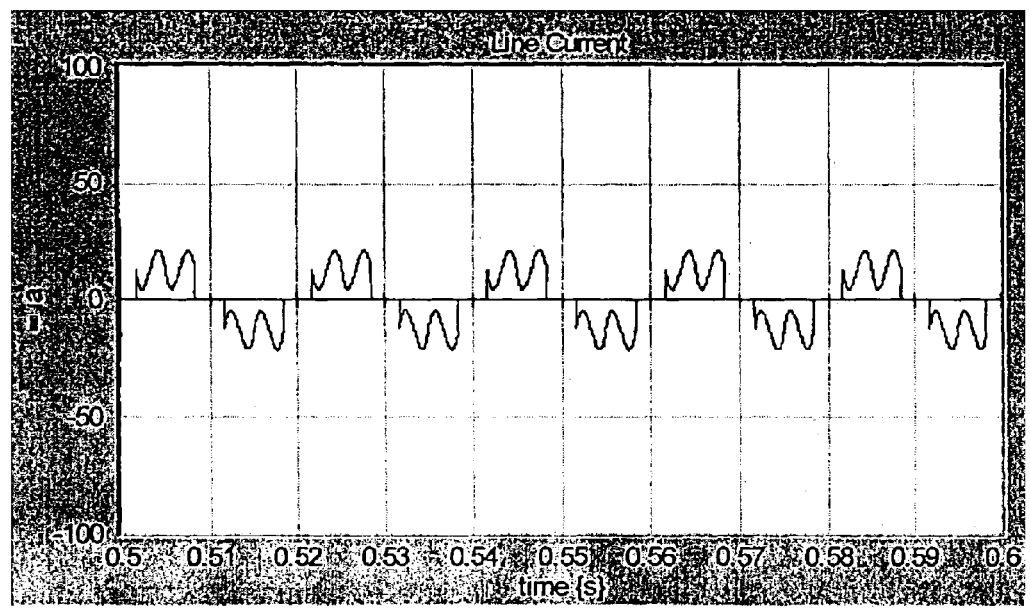
FIG. 11 shows the line current through phase A of that system with a non-linear inductor and the load on the system at only a predetermined percentage of the rated load.

FIGS. 8 and 9 show the inductor current IL and line current Ia of input phase 16a at rated load, respectively, with a dc side non-linear inductor. FIGS. 10 and 11 show the inductor current IL and line current Ia of input phase 16a at 33% load, respectively, with a dc side non-linear inductor. Tables 3 and 4, below, show the harmonic current data at rated load and at 33% load respectively.

TABLE 3

| Harmonic Order | Harmonic Current (A) | % of RMS Current |
|---|---|---|
| Fundamental | 42.51 | 94.16 |
| $5^{th}$ | 11.11 | 24.60 |
| $7^{th}$ | 8.27 | 18.31 |
| $11^{th}$ | 4.47 | 9.90 |
| $13^{th}$ | 2.99 | 6.62 |
| $17^{th}$ | 2.48 | 5.48 |
| $19^{th}$ | 2.09 | 4.64 |
| RMS Current (A) | | 45.15 A |
| % THD | | 33.67% |

TABLE 4

| Harmonic Order | Harmonic Current (A) | % of RMS Current |
|---|---|---|
| Fundamental | 14.88 | 88.86 |
| $5^{th}$ | 5.83 | 34.81 |
| $7^{th}$ | 4.51 | 26.94 |
| $11^{th}$ | 1.23 | 7.36 |
| $13^{th}$ | 1.36 | 8.14 |
| $17^{th}$ | 0.81 | 4.81 |
| $19^{th}$ | 0.80 | 4.78 |
| RMS Current (A) | | 16.74 A |
| % THD | | 45.87% |

A comparison of the harmonic data from Table 1 and Table 3 shows that when a non-linear inductor is used, the line harmonics at rated current are lower than the harmonic currents produced by the linear inductor. A comparison of harmonic current data from Table 2 and Table 4 shows that at partial load the non-linear inductor produces a substantially lower percentage harmonic currents than the linear inductor.

Figure 12:
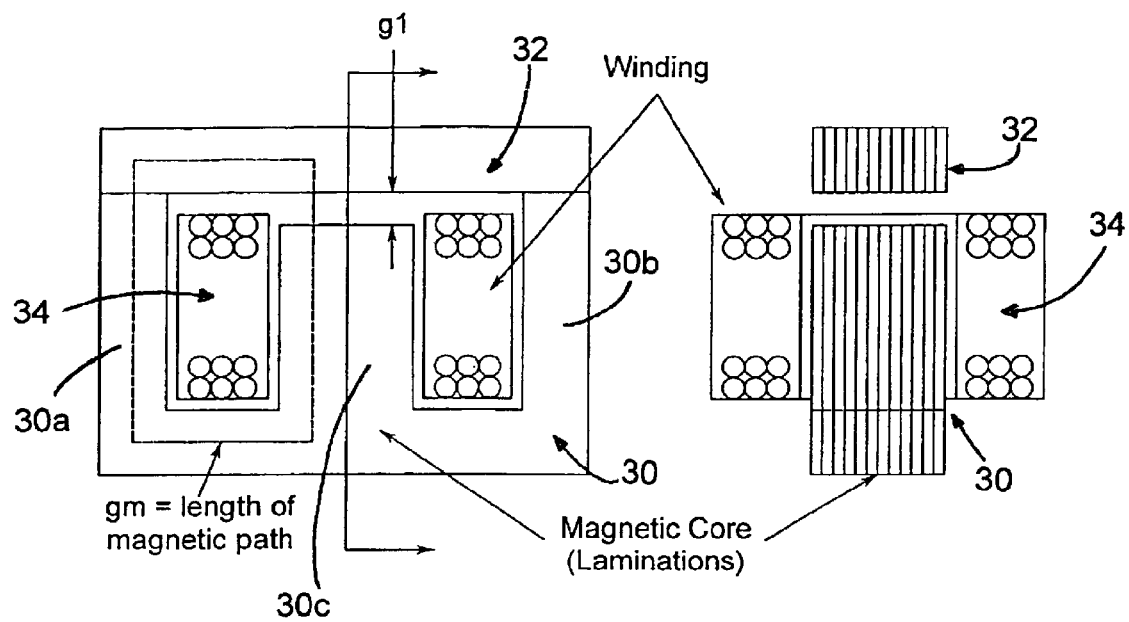
FIG. 12 shows one of the most commonly used construction techniques used to make a linear dc side inductor.

Referring now to FIG. 12, there is shown the most commonly used construction method to manufacture a linear dc side inductor. This method uses a stack of E and I type magnetic material laminations 30 and 32, respectively, and a winding 34 around the middle leg 30c of the E laminations. A constant width air gap g1 is introduced at the middle leg 30c of the E laminations. It is also possible to introduce an air gap in the two outer legs 30a, 30b of the E laminations. An approximate equation for the inductance value L of this type of the inductor is:

$$L \propto \mu_0 \frac{N^2}{\left(\frac{g l}{1} + \frac{g m}{\mu_r}\right)} \qquad \text{Eq. 1}$$

where:
g1=air gap
gm=magnetic path length in the laminations
$\mu_0$=permeability of air
$\mu_r$=relative permeability of lamination material
N=number of turns in the winding.

Since the relative permeability of the lamination material, $\mu_r$, is quite high (greater than 1000) as compared, with the relative permeability of the air (equal to 1) in the gap g1, the inductance value is inversely proportional to the width of air gap g1. In this type of design for a linear dc inductor, the value of the inductance is, as is shown in FIG. 7, fairly constant over the intended operating current range. The flux density in the laminations 30, 32 is below the saturation flux density level and the relative permeability of the lamination material 1, is fairly high. At higher current levels, the laminations 30, 32 start saturating which means $\mu_r$ of the lamination material starts to rapidly decrease. Therefore, as seen from Eq. 1, inductance value also starts to decrease as shown in FIG. 7.

Figure 13:
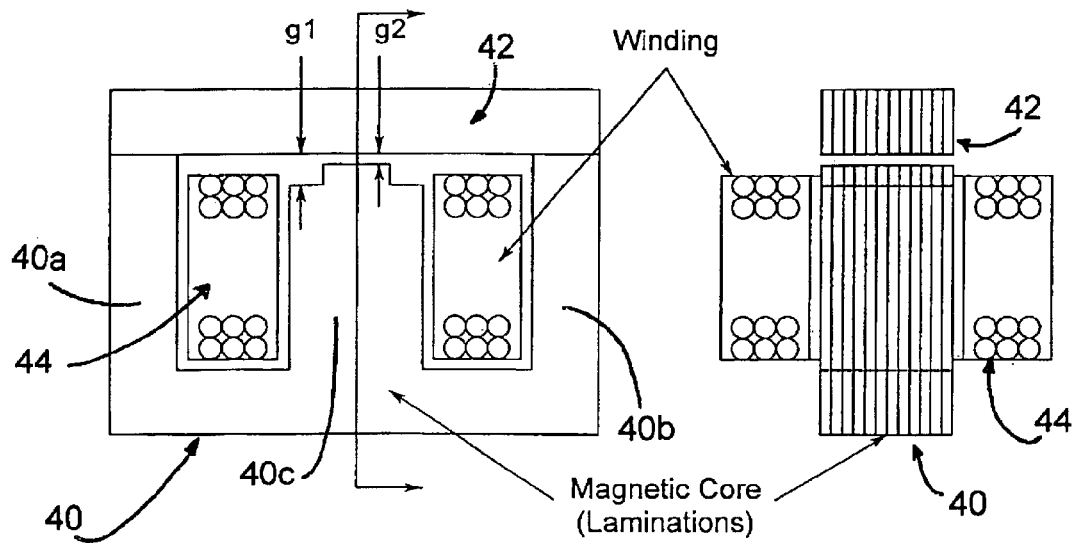
FIG. 13 shows a construction technique for making a non-linear inductor using E and I laminations.

FIG. 13 shows one of the two construction methods for the non-linear inductor of the present invention. As with the linear inductor of FIG. 12, the non-linear inductor of FIG. 13 uses a stack of E and I laminations 40 and 42, respectively and a winding 44 around the middle leg 40c of the E lamination 40.

The linear dc side inductor of FIG. 12 has a constant air gap width g1. Instead of that constant air gap width the air gap of the non-linear inductor of FIG. 13 has a step width g2 (where g2<g1) for a portion of the middle leg 40c of the E lamination 40. All of the E laminations 40 used in the construction of the non-linear dc side inductor have an identically cut step air gap. The proportion of the width of the middle leg 40c of the E lamination 40 that produces the smaller air gap g2 with lamination 42 can be varied to achieve the desired non-linearity effect. For example, the inductance versus current curve for the non-linear inductor shown in FIG. 7 was achieved by choosing the width of gap g2 to be equal to 25% of the width of gap g1 and the width of the small air gap g2 was 40% of the width of the middle leg 40c of the E lamination 40.

The non-linear behavior of the dc side inductor shown in FIG. 13 can be explained as follows. At low operating currents, the $\mu_r$ of the laminations 40, 42 is high and the inductance is dominated by the small air gap g2 and therefore the inductance value is high. As the operating current increases, the lamination material below the small air gap starts to saturate and decreases rapidly with the consequent rapid decrease in inductance that is shown in FIG. 7 for the non-linear inductor.

When such a non-linear inductor is used as the dc side filter inductor 12 in the rectifier circuit 10 of FIG. 1, the higher value of the inductance at low operating currents (partial load) produces a lower magnitude of the current ripple through the inductor, as shown in FIG. 10, when compared with the ripple produced by the linear inductor at partial load as shown in FIG. 5. This reduction in the ripple current is responsible for the lower harmonic currents due to the non-linear inductor at partial loads, as shown in Table 4, when compared with the harmonic currents produced by the linear inductor at partial loads shown in Table 2.

Figure 14:
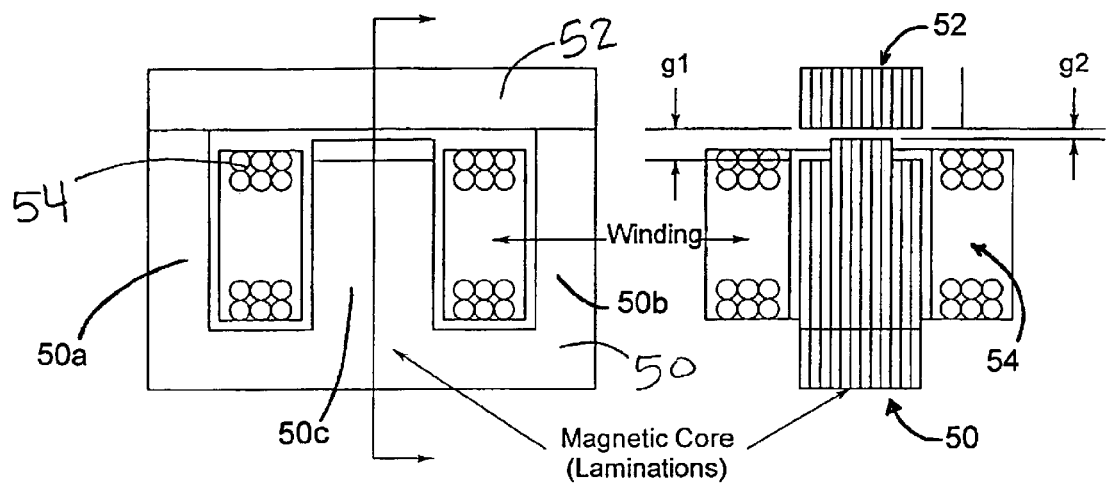
FIG. 14 shows another construction technique for making a non-linear inductor using E and I laminations.

FIG. 14 shows the second method to construct the non-linear inductor of the present invention. In this construction the middle leg. 50c of some of the E laminations 50 have a constant width air gap g1 with lamination 52 and the middle leg 50c of the remainder of the E laminations 50 have a different value of constant width air gap g2 (where g2<g1) with lamination 52. The ratio of the number of laminations 50 with a middle leg 50c that has a small air gap with lamination 52 to those that have a big air gap with lamination 52 can be chosen to achieve the desired non-linear effect. The inductance versus current curve for the non-linear inductor shown in FIG. 7 was achieved by choosing that ratio to be equal to 2:3.

The small and big air gap laminations can be placed in different positions relative to each other. In the non-linear inductor of FIG. 14 they are shown with those laminations of the middle, leg 50c that produces the smaller air gap with laminations 52 in the center of the entire stack. Another option is to reverse the arrangement where the big air gap laminations are in the center of the stack. Some other arrangements are: side-by-side positioning of small and big air gap laminations or dispersing small and big air gap laminations uniformly throughout the stack of E laminations 50.

While the constructions shown in FIGS. 13 and 14 for the non-linear inductor of the present invention uses a stack of E and I laminations with the air gap in the middle leg of the E lamination it should be appreciated that:

a) an air gap having the characteristics described above for the embodiments of FIGS. 13 and 14 may also be at either of both of end legs 40a and 40b for the embodiment of FIG. 13 and at either or both of end legs 50a and 50b for the embodiment of FIG. 14; and b) the non-linear inductor in both figures may also be embodied using for example only E laminations or using U shaped laminations and I laminations or using only U shaped laminations or any other shape or combination of shapes of laminations that allow for one or more gaps that have the characteristics described above for the embodiments of FIGS. 13 and 14.

Figure 15:
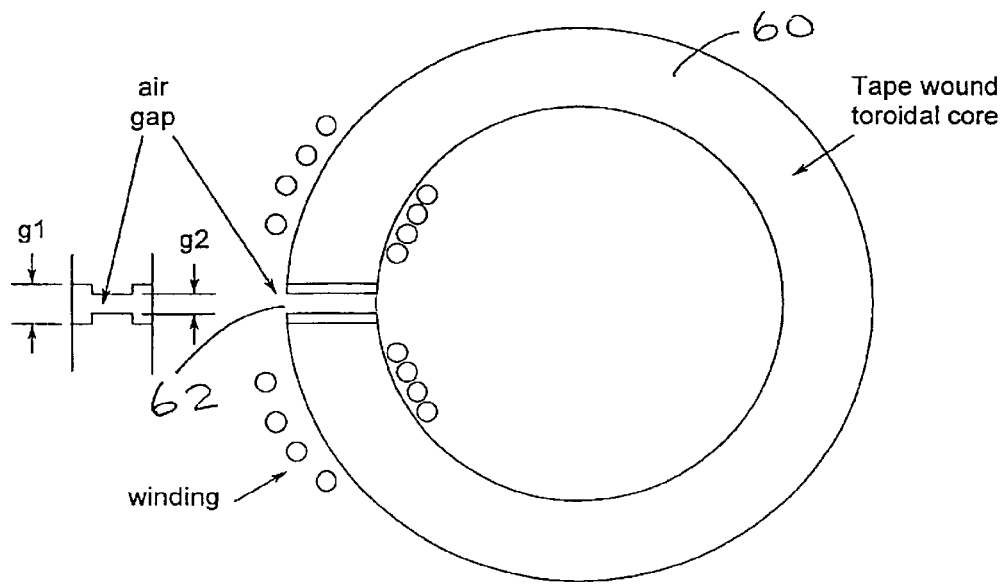
FIG. 15 shows a construction technique for making a dc side non-linear inductor in the form of a toroidal core.

FIG. 15 shows a construction method for a dc side non-linear inductor in the form of a toroidal core 60. In this construction a tape of a magnetic material is wound in a toroidal shape. An air gap 62 is introduced by cutting core 60 in an axial direction. As shown in the FIG. 15, the larger air gap g1 is placed on the outer edge of the toroidal core 60 and smaller air gap g2 is placed in the middle of the toroidal core 60. In this sense, the construction of FIG. 15 is the toroidal equivalent of the stepped gap E-I construction of FIG. 13.

Figure 16:
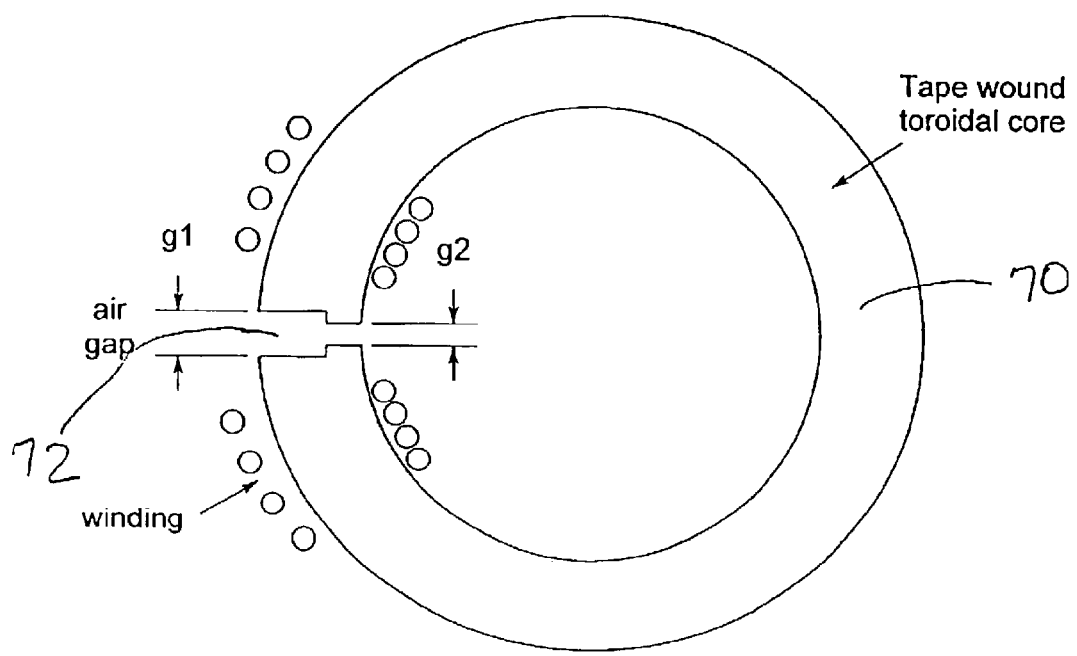
FIG. 16 shows another construction technique for making a dc side non-linear inductor in the form of a toroidal core.

FIG. 16 shows a construction method for a dc side non-linear inductor in the form of a toroidal core 70 which as is described below has an air gap that is different in construction than the air gap of toroidal core 60 of FIG. 15.

In core 70 a tape of a magnetic material is wound in a toroidal shape. An air gap 72 is introduced by cutting core 70 in a radial direction. But instead of a constant air gap, the tape or "laminations" on the outside (diameter) of the toroidal core 70 have a bigger air gap (g1) than the air gap (g2) in the tape or "laminations" which are inside (diameter) the toroidal core 70. In this sense, the construction of FIG. 16 is the toroidal equivalent of the variable gap E-I construction of FIG. 14.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A non-linear inductor comprising:
   a first stack of first laminations, said first laminations each having a first leg with an edge and a plurality of other legs, said first legs forming a first leg portion of the first stack and said other legs forming other leg portions of the first stack, said first leg portion having an end formed by the edges of the first legs; and
   a second stack of second laminations each having the same predetermined shape, said second stack of second laminations being disposed adjacent said first stack of first laminations to form a flow path for magnetic flux, said first leg portion of the first stack and said second stack cooperating to create an air gap between the end of the first leg portion of the first stack and said second stack, said air gap having portions with different widths and being configured to produce a desired non-linear inductance characteristic for said non-linear inductor;
   a winding disposed around the first leg portion or one of the other leg portions of the first stack;
   wherein portions of the second stack adjoin the other leg portions of the first stack, respectively, and
   wherein the air gap defined by the first leg portion of the first stack and the second stack extends the entire depth of the second stack in the stacking direction of the second stack.

2. The non-linear inductor of claim 1, wherein each of said first laminations has an E shape and includes a center leg and end legs and wherein the first leg is said center leg and the other legs comprise said end legs.

3. The non-linear inductor of claim 1, wherein a first predetermined number of said first laminations in said first stack has a first predetermined length for said first leg and a second predetermined number of said first laminations in said first stack has a second predetermined length for said first leg, said first and second predetermined lengths being different, and wherein the difference in lengths between the first and second predetermined lengths offsets the edges of the first predetermined number of the first laminations from the edges of the second predetermined number of the first laminations, thereby providing the end of the first leg portion with a stepped contour and forming the portions of the air gap with the different widths.

4. The non-linear inductor of claim 3 wherein said first predetermined number and said second predetermined number of said first laminations in said first stack are selected in a ratio to each other to produce a desired inductance characteristic for said non-linear inductor.

5. The non-linear inductor of claim 3 wherein said first predetermined number and said second predetermined number of said first laminations in said first stack are arranged in an order with respect to each other to produce a desired inductance characteristic for said non-linear inductor.

6. The non-linear inductor of claim 3 wherein each of said first laminations has an E shape and includes a center leg and end legs and wherein said first leg is said center leg and said other legs comprise said end legs.

7. A non-linear inductor comprising:
   a magnetic body having first and second sections, said first section having a stepped end and comprising a stack of laminations of magnetic material, said stepped end of the first section being separated from the second section so as to form a stepped air gap therebetween, said air gap comprising a first step portion with a first width, a second step portion with a second width and a third step portion having the first width, said first and second widths being different; and
   a winding disposed around at least a portion of the first section of the magnetic body; and
   wherein the second step portion is disposed between the first and third step portions.

8. The non-linear inductor of claim 7 wherein the air gap further comprises a third step portion having the first width, wherein the body comprises magnetic material tape wound into a torroid, wherein the laminations comprise portions of the tape, and wherein said body is cut in an axial direction to produce said air gap, said first and third step portions being disposed adjacent the edges of said toroid, respectively, and said second step portion being disposed between said first and third step portions.

9. The non-linear conductor of claim 8 wherein said first width is greater than said second width.

10. The non-linear inductor of claim 7 wherein the body comprises magnetic material tape wound into a toroid, wherein the laminations comprise portions of the tape, and wherein said body is cut in a radial direction to produce said air gap, said first step portion being disposed adjacent the outer edge of said toroid and the second step portion being disposed adjacent the inner edge of said toroid.

11. The non-linear conductor of claim 10 wherein said first width is greater than said second width.

12. The non-linear conductor of claim 7, wherein the second step portion of the air gap is located midway along the depth of the first section in the stacking direction.

13. The non-linear conductor of claim 12, wherein his first width is greater than the second width.

14. The non-linear conductor of claim 7, wherein the second step portion of the air gap extends the entire depth of the first section in the stacking direction.

15. The non-linear conductor of claim 14, wherein the body comprises magnetic material tape wound into a toroid and wherein the laminations comprise portions of the tape.

16. The non-linear conductor of claim 7, wherein the laminations of the first section comprise first laminations and the stack comprises a first stack, said first laminations each having a first leg with an edge and at least one other leg, said first legs forming a first leg portion of the first stack and said at least one other legs forming at least one other leg portion of the first stack, said first leg portion having the stepped end, which is formed by the edges of the first legs; and
   wherein the second section comprises a stack of second laminations, said second stack of second laminations being disposed adjacent to the first stack of first laminations to form a flow path for magnetic flux, said first leg portion of the first stack and said second stack operating to create the air gap between the stepped end of the first leg portion of a first stack and said second stack, said air gap being configured to produce a desired non-linear inductance characteristic for said non-linear inductor.

17. The non-linear conductor of claim 16, wherein the first laminations in the first stack are arranged in first, second and third groups, wherein the first laminations in the first and third groups each have a first predetermined length for the first leg, and the first laminations in the second group each have a second predetermined length for the first leg, said first and second predetermined lengths being different, and wherein the difference in lengths between the first and second predetermined lengths offsets the edges of the first legs in the first and third groups from the edges of the first legs in the second group, thereby forming the stepped end and the first, second and third step portions of the air gap.

18. The non-linear conductor of claim 7, wherein the laminations of the first section comprise first laminations and the stack comprises a first stack, said first laminations each having the same predetermined shape and including a leg with a stepped edge, said legs of the first laminations forming a leg portion of the first stack;

wherein the second section comprises a stack of second laminations, said second stack of second laminations being disposed adjacent to the first stack of first laminations to form a flow path for magnetic flux, said leg portion of the first stack and said second stack cooperating to create the air gap between the stepped edges of the legs in the leg portion of the first stack and said second stack, said air gap being configured to produce a desired non-linear inductance characteristic for said non-linear inductor; and wherein the stepped edges are aligned, thereby forming the stepped end and the first and second step portions of the air gap.

19. The non-linear inductor of claim 18, wherein each of the first laminations is E-shape and includes a center leg disposed between a pair of end legs, said center leg being the leg with the stepped edge;

wherein the first stack comprises a center leg portion disposed between a pair of end leg portions, said center leg portion being the leg portion of the first stack that cooperates with the second stack to form the air gap;

and wherein the first and second portions of the air gap are arranged adjacent to each other in the direction between the end leg portions of the first stack.

20. The non-linear inductor of claim 1, wherein the first laminations each have the same predetermined shape;

wherein the edge of the first leg is stepped; and wherein the stepped edges of the first legs are aligned, thereby providing the end of the first leg portion with a stepped contour and providing the air gap with first and second step portions having first and second widths, respectively, said first and second widths being different.

21. The non-linear inductor of claim 20, wherein each of the first laminations is E-shaped and includes a center leg disposed between a pair of end legs, said center leg being the leg with the stepped edge;

wherein the first stack comprises a center leg portion disposed between a pair of end leg portions, said center leg portion being the leg portion of the first stack that cooperates with the second stack to form the air gap; and wherein the first and second portions of the air gap are arranged adjacent to each other in the direction between the end leg portions of the first stack.

22. The non-linear inductor of claim 2, wherein the first stack comprises a center leg portion disposed between a pair of end leg portions, said center leg portion being the first leg portion of the first stack and said end leg portions being the other leg portions; and wherein each of the second laminations is I-shaped, and wherein end portions of the second stack adjoin the end leg portions of the first stack, respectively, such that no air gaps are formed between the end leg portions of the first stack and the end portions of the second stack.

23. The non-linear inductor of claim 22, wherein the air gap extends uninterrupted between the center leg portion of the first stack and the second stack for the entire width of the center leg portion of the first stack.

* * * * *